(12) United States Patent
Tsai et al.

(10) Patent No.: US 11,743,867 B2
(45) Date of Patent: *Aug. 29, 2023

(54) BLIND DETECTION AND CCE ALLOCATION FOR CARRIER AGGREGATION

(71) Applicant: Mediatek Inc., Hsinchu (TW)

(72) Inventors: Lung-Sheng Tsai, Hsinchu (TW); Chien-Hwa Hwang, Hsinchu (TW); Yi-Ju Liao, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,902

(22) Filed: Mar. 24, 2022

(65) Prior Publication Data

US 2022/0217683 A1 Jul. 7, 2022

Related U.S. Application Data

(63) Continuation of application No. 16/916,270, filed on Jun. 30, 2020, now Pat. No. 11,317,379.

(Continued)

(51) Int. Cl.
*H04L 5/00* (2006.01)
*H04W 72/02* (2009.01)
(Continued)

(52) U.S. Cl.
CPC ....... *H04W 72/02* (2013.01); *H04W 72/1273* (2013.01); *H04L 1/0038* (2013.01); *H04L 5/0098* (2013.01); *H04W 52/0229* (2013.01)

(58) Field of Classification Search
CPC ... H04L 1/0038; H04L 5/0092; H04L 5/0098; H04L 5/001; H04L 27/2676; H04W 52/0229; H04W 72/0446

(Continued)

(56) References Cited

U.S. PATENT DOCUMENTS

2012/0263052 A1* 10/2012 Dai .................. H04L 5/001
370/252
2014/0219202 A1* 8/2014 Kim .................. H04L 5/0055
370/329

(Continued)

FOREIGN PATENT DOCUMENTS

CN 109089316 A 12/2018
WO 2019031580 A1 2/2019

OTHER PUBLICATIONS

China Patent Office, "Office Action", dated Apr. 7, 2022, China.

*Primary Examiner* — Wutchung Chu
*Assistant Examiner* — Jason A Harley
(74) *Attorney, Agent, or Firm* — Locke Lord LLP; Tim Tingkang Xia, Esq.

(57) ABSTRACT

A UE determines N1 component carriers on each of which the UE is configured to detect a respective one PDCCH in a slot. The UE determines N2 component carriers on each of which the UE is configured to detect respective at least two PDCCHs in the slot. The UE determines a total Q blind detections of PDCCH that the UE is capable of performing. The UE determines a first predetermined scaling factor X. The UE allocates M1 blind detections of the Q blind detections to be available on each of the N1 component carriers and M2 blind detections of the Q blind detections to be available on each of the N2 component carriers such that (N1*M1+N2*M2) is a largest integer no greater than Q. M2 equals to X*M1. The UE performs blind detections in accordance with the allocations.

20 Claims, 11 Drawing Sheets

Related U.S. Application Data

(60) Provisional application No. 62/893,231, filed on Aug. 29, 2019, provisional application No. 62/888,062, filed on Aug. 16, 2019, provisional application No. 62/880,132, filed on Jul. 30, 2019.

(51) Int. Cl.
| | |
|---|---|
| *H04W 72/04* | (2023.01) |
| *H04W 8/24* | (2009.01) |
| *H04L 29/12* | (2006.01) |
| *H04W 88/02* | (2009.01) |
| *H04W 72/12* | (2023.01) |
| *H04L 25/02* | (2006.01) |
| *H04W 72/1273* | (2023.01) |
| *H04W 52/02* | (2009.01) |
| *H04L 1/00* | (2006.01) |

(58) Field of Classification Search
USPC .......................................................... 370/329
See application file for complete search history.

(56) References Cited

U.S. PATENT DOCUMENTS

| | | | | |
|---|---|---|---|---|
| 2016/0135143 | A1* | 5/2016 | Won | H04W 52/367 |
| | | | | 370/312 |
| 2018/0287761 | A1* | 10/2018 | You | H04L 5/0053 |
| 2019/0349155 | A1* | 11/2019 | Xu | H04L 5/0042 |

\* cited by examiner

BLIND DETECTION AND CCE ALLOCATION FOR CARRIER AGGREGATION

CROSS-REFERENCE TO RELATED APPLICATION(S)

This application is a continuation of U.S. patent application Ser. No. 16/916,270, entitled "BLIND DETECTION AND CCE ALLOCATION FOR CARRIER AGGREGATION" and filed on Jun. 30, 2020, which claims the benefits of U.S. Provisional Application Ser. No. 62/880,132, entitled "METHOD SUPPORTING MULTIPLE TRP TRANSMISSION AND CARRIER AGGREGATION" and filed on Jul. 30, 2019; U.S. Provisional Application Ser. No. 62/888,062, entitled "ENHANCEMENTS ON MULTI-TRP/PANEL TRANSMISSION" and filed on Aug. 16, 2019; and U.S. Provisional Application Ser. No. 62/893,231, entitled "ENHANCEMENTS ON MULTI-TRP/PANEL TRANSMISSION" and filed on Aug. 29, 2019; all of which are expressly incorporated by reference herein in their entirety.

BACKGROUND

Field

The present disclosure relates generally to communication systems, and more particularly, to techniques of allocating blind detections/CCEs on certain component carriers at a UE for monitoring a single physical down link control channel (PDCCH) from a TRP and on other component carriers for monitoring multiple PDCCHs from multiple transmission and reception points (TRPs).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines N1 component carriers on each of which the UE is configured to detect a respective one physical down link control channel (PDCCH) in a slot. N1 is a positive integer. The UE determines N2 component carriers on each of which the UE is configured to detect respective at least two PDCCHs in the slot. N2 is a positive integer. The UE determines a total Q blind detections of PDCCH that the UE is capable of performing. Q is a positive integer. The UE determines a first predetermined scaling factor X. X is a positive number. The UE allocates M1 blind detections of the Q blind detections to be available on each of the N1 component carriers and M2 blind detections of the Q blind detections to be available on each of the N2 component carriers such that (N1*M1+N2*M2) is a largest integer no greater than Q. M1 is a positive integer. M2 is a positive integer and equal to X*M1. The UE performs blind detections in accordance with the allocations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
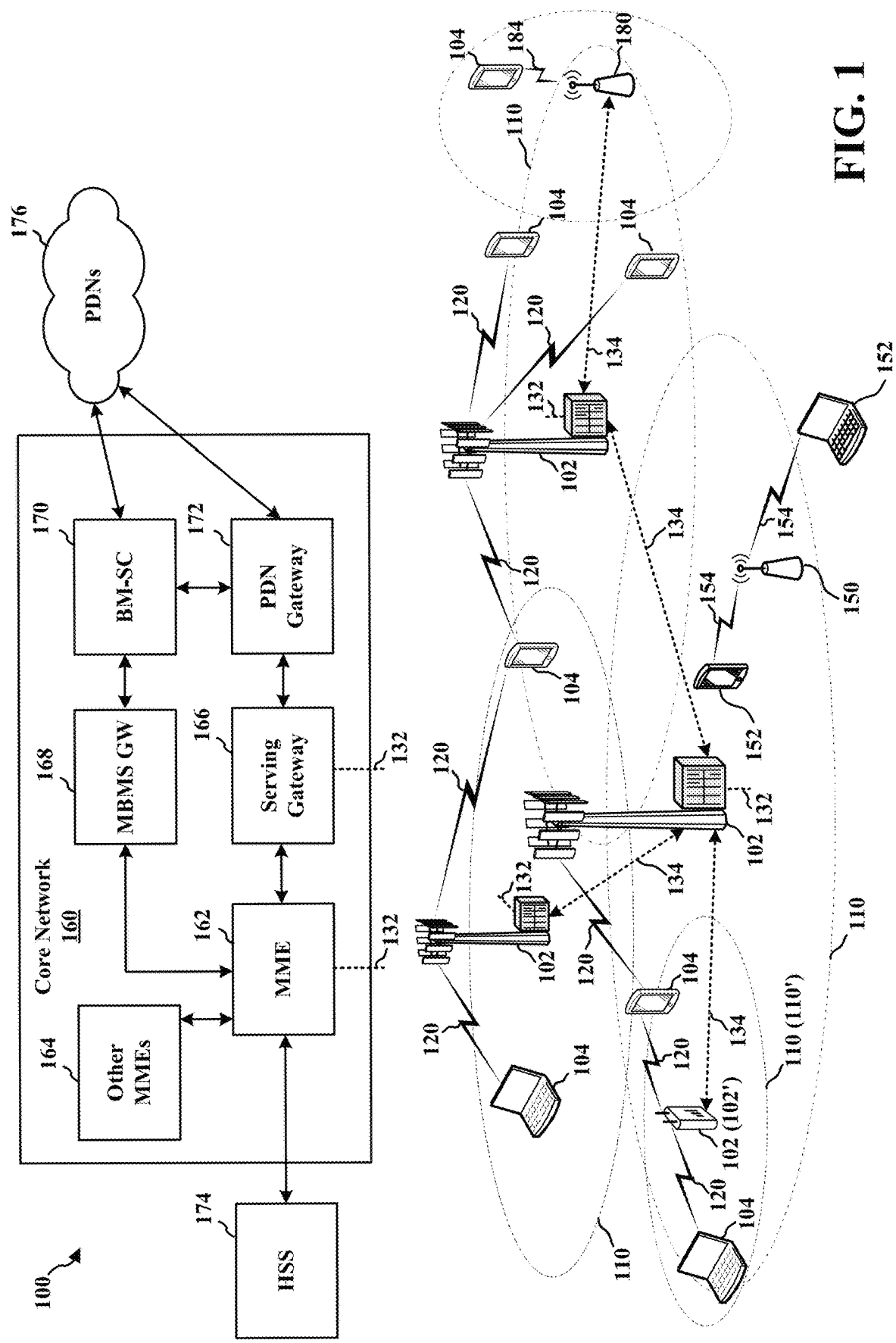
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station gNB 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to PDNs 176. The PDNs 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
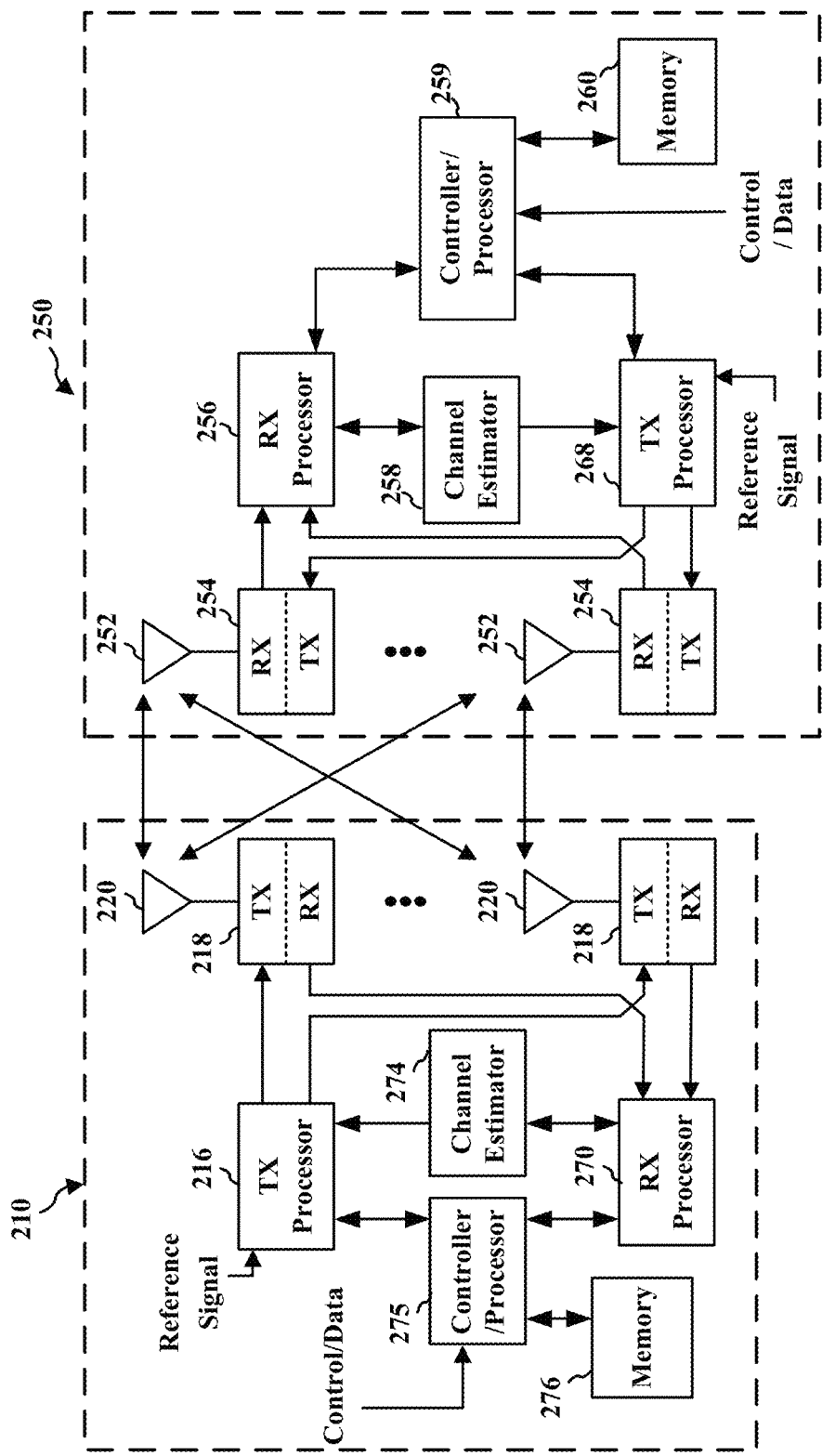
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing.

The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
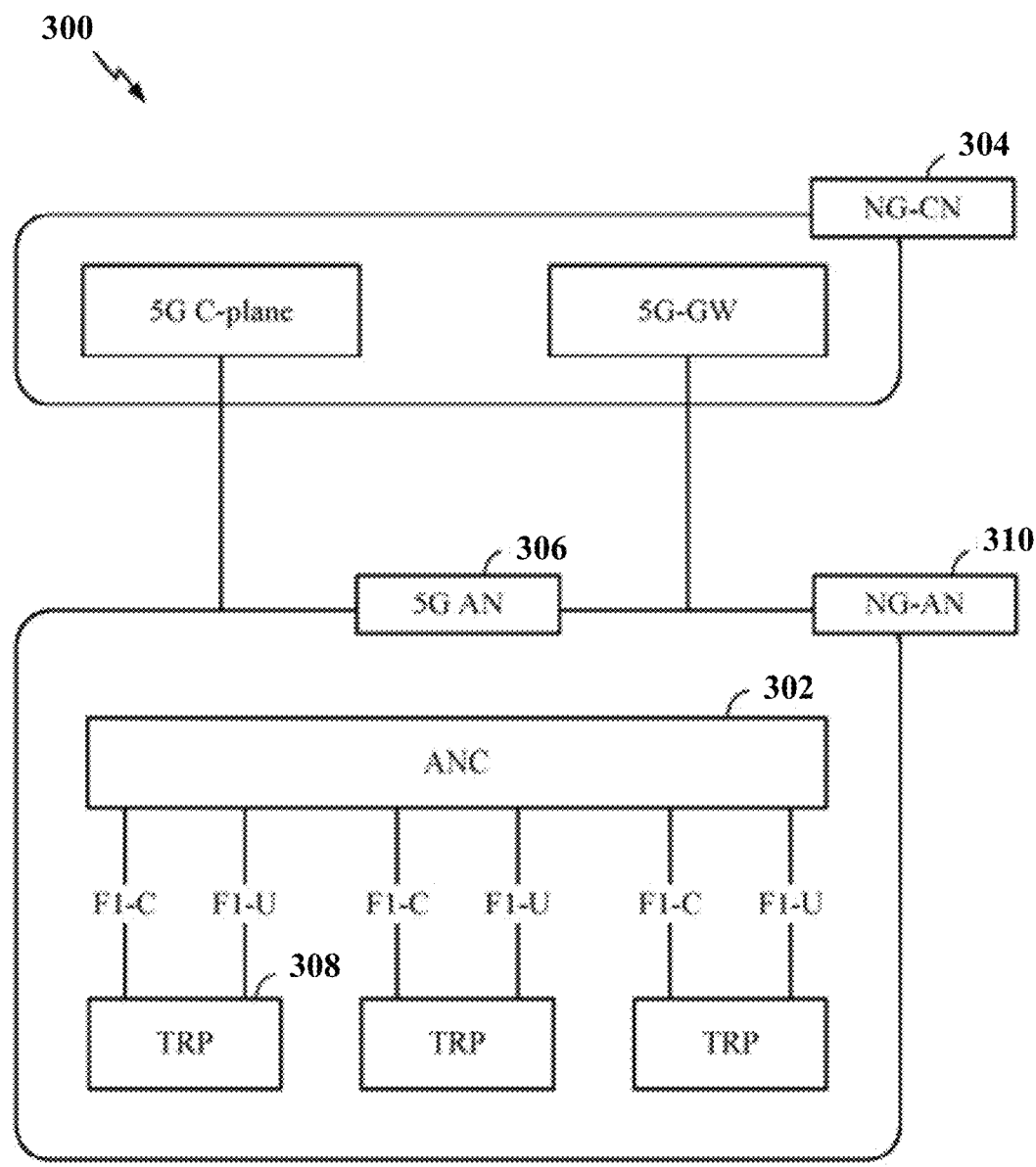
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
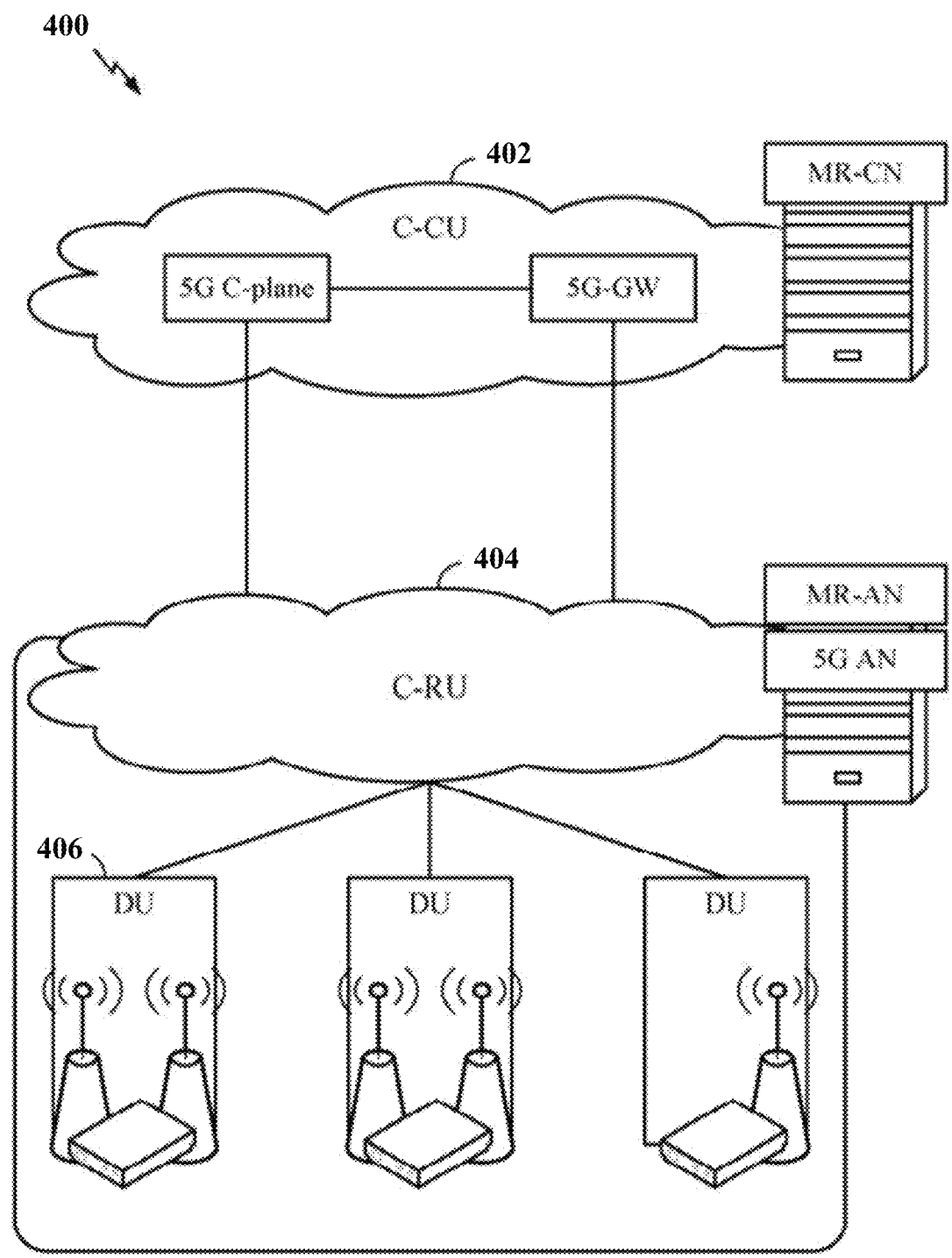
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
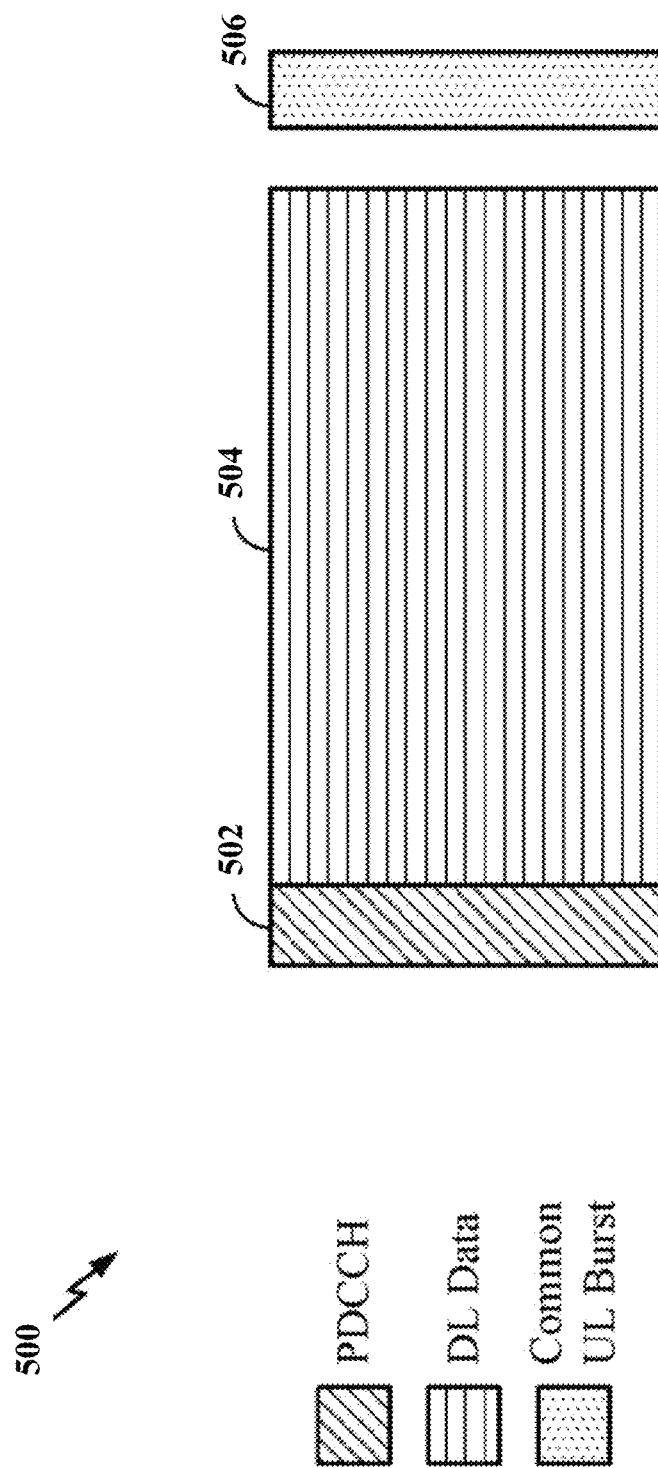
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
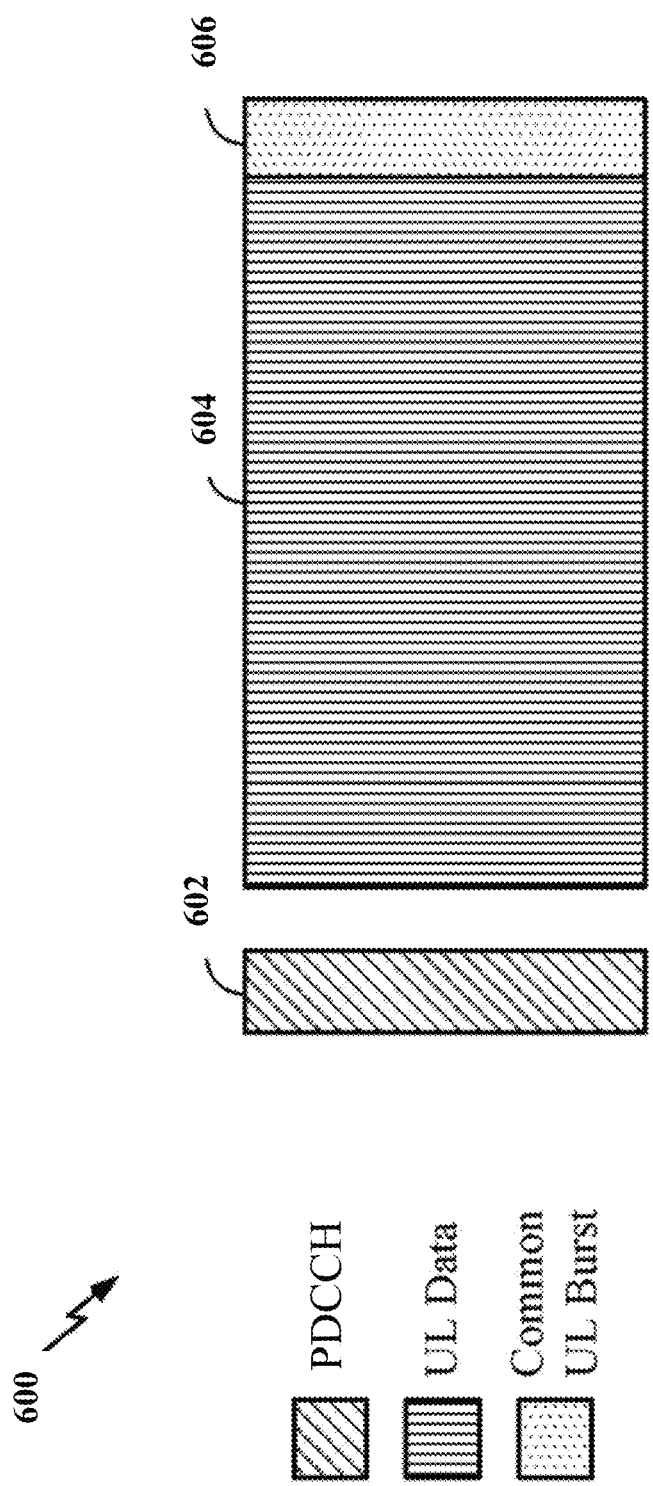
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In the present disclosure, one or more terms or features are defined or described in "3GPP TS 38.213 V15.6.0 (2019-06) Technical Specification; 3rd Generation Partnership Project; Technical Specification Group Radio Access Network; NR; Physical layer procedures for control; (Release 15)" (3GPP TS 38.213), which is expressly incorporated by reference herein in its entirety. Those terms and features are known by a person having ordinary skill in the art.

Figure 7:
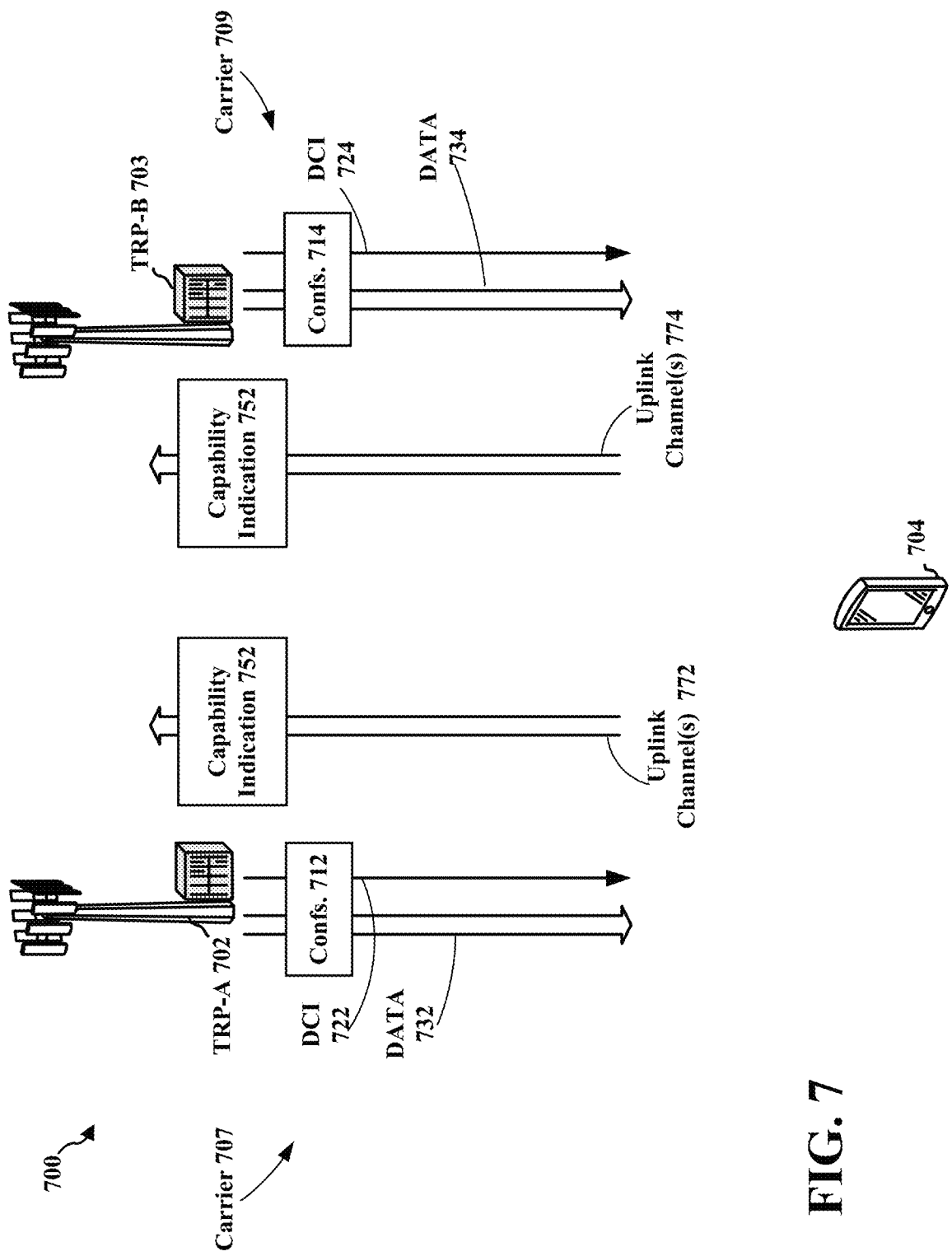
FIG. 7 is a diagram illustrating communication between a UE and multiple TRPs.

FIG. 7 is a diagram 700 illustrating communication between a UE 704 and multiple TRPs. The UE 704 is configured to communicate signaling and data with multiple transmission and reception points (TRPs), concurrently. In particular, the UE 704 can receive respective PDCCHs from the multiple TRPs, concurrently. In this example, only a TRP-A 702 and a TRP-B 703 are shown in FIG. 7, and the other TRPs are not shown.

In this example, the UE 704 supports multiple-PDCCH based multiple-TRP/panel transmission. The TRP-A 702 may transmit, on a carrier 707, DCI 722 (e.g., in a PDCCH) and data 732 (e.g., in a PDSCH), and the TRP-B 703 may transmit, on a carrier 709, DCI 724 (e.g., in a PDCCH) and data 734 (e.g., in a PDSCH), simultaneously to the UE 704. The UE 704 and the TRP-A 702 also established uplink channel(s) 772 on the carrier 707; the UE 704 and the TRP-B 703 also established uplink channel(s) 774 on the carrier 709.

The carrier 707 and the carrier 709 may overlap in time and frequency domains. The TRP-A 702 and the TRP-B 703 may communicate control and data signals with the UE 704 on the same resource grid. The TRP-A 702 and the TRP-B 703 each may be located at a different base station.

In this example, the UE 704 may be configured to monitor PDCCHs from only the TRP-A 702 (or the TRP-B 703) on a number of component carriers and to monitor PDCCHs from both the TRP-A 702 and the TRP-B 703 on a number of other component carriers shared by the TRP-A 702 and the TRP-B 703.

The UE has limited capability to perform blind detections to obtain PDCCHs carried on the component carriers. The UE 704 may send a capability indication 752 to the TRP-A 702 on the uplink channel(s) 772 and/or to the TRP-B 703 on the uplink channel(s) 774. The capability indication 752 indicates the capability of the UE 704 for performing blind detections and the number of Control-Channel Elements (CCEs), on the component carriers, at which the blind detections are performed.

From the perspective of the UE 704, it is not preferred to significantly increase the number of blind detections and the number of CCEs to be monitored for multi-PDCCH based multi-TRP transmission.

In one technique, processing-power allocated for another component carrier may be moved to handle multi-PDCCH processing of a given component carrier, under the constraint that the total number of blind detections/CCEs that a UE can use is fixed and independent of M-TRP operation. For example, a UE capable of supporting single-TRP for two component carriers may be also capable of supporting multi-TRPs for only one component carrier. In this regard, RRC configurations per component carrier may be introduced to indicate support for single-DCI based or multi-DCI multi-TRP transmissions. Rules for determining the maximum number of blind detections/CCEs can be used in each component carrier with or without supporting multi-TRP transmissions.

For example, based on the capability indication 752 received from the UE 704, the network can configure the maximum number of blind detections/CCEs for the UE 704. The TRP-A 702 may send configurations 712 and/or the TRP-B 703 may send configurations 714 to the UE 704 to indicate the maximum blind detections/CCEs configured for the UE 704.

The UE 704 may distribute the available maximum blind detections/CCEs across component carrier and TRP domains. In one possible approach, the maximum number of monitored PDCCH candidates per slot for a downlink bandwidth part supporting two-DCI based PDSCH transmission can be set to be about twice the maximum number for a downlink bandwidth part supporting only single-DCI based PDSCH transmission. For example, when SCS is 15 KHz, a predefined maximum number of blind detections (BDs) per CC may be 44. This maximum number may be increased by a scaling factor of two to 88 for the M-DCI case. The predefined maximum number is applicable for a UE that can provide sufficient processing power for PDCCH monitoring and decoding. The scaling factor used to increase the maximum number of BDs or CCEs for monitoring can be set via RRC configuration. Whether the maximum number of monitored PDCCH candidates per slot for an M-DCI based component carrier (CC) should be doubled can be changed or configured. The total maximum number of blind detections/CCEs across component carriers can be derived by legacy capability signaling mechanism (e.g., by the IE pdcch-BlindDetectionCA if UE supports carrier aggregation with more than 4 downlink component carriers, or by the maximum number of blind detections/CCEs per CC multiplied by the number of supported component carriers for a UE that supports no more than 4 downlink component carriers). If a UE cannot meet the requirement of PDCCH processing power corresponding to the predefined maximum number of BD/CCEs for PDCCH monitoring and decoding, the UE may distribute the available maximum blind detections/CCEs across component carrier and TRP domains.

Accordingly, the UE 704 may be configured for operation of two-DCI reception per component carrier. The UE 704 may be configured for operation of single-DCI reception with PDCCH supporting indication of more than one TCI-states per component carrier. The UE 704 may be configured with a capability of a maximum number of component carriers supporting two-DCI reception.

From network's perspective, after obtaining the capability reporting from the UE 704 (e.g., through the capability indication 752), the network can configure multiple component carriers, on which multi-TRP transmission may or may not be supported. The network can learn all combinations of (number of single-DCI component carriers, number of multi-DCI component carriers) that can be configured for the UE. The network can configure UE to enable single-DCI operation a candidate component carrier based on UE's capability reporting on the maximum number of component carriers supporting single-DCI reception with PDCCH supporting indication of more than one TCI-states. Similarly, the network can configure UE to enable multi-DCI operation for a candidate component carrier based on UE's capability reporting on the maximum number of component carriers supporting multi-DCI reception. According to the UE's capability for PDCCH BD/CCE numbers and the number of CCs configured for S-DCI and M-DCI operations, if the capability for PDCCH BD/CCE numbers are not sufficient to allow applying the predefined maximum number of monitored PDCCH candidates per slot in each CC (e.g., the numbers 44 and 88 in previous example for cases with the SCS is 15 KHz), then the UE's capability for PDCCH BD/CCE numbers can be distributed in both component carrier and TRP domain.

In this technique, the number of component carriers on which the UE 704 is configured to monitor a single PDCCH with subcarrier spacing (SCS) μ is $N_{cells}^{DL,1-DCI,\mu}$; the number of component carriers on which the UE 704 is configured to monitor a single PDCCH with subcarrier spacing (SCS) μ is $N_{cells}^{DL,2-DCI,\mu}$.

The UE 704 may report, e.g., through RRC signaling, a parameter pdcch-BlindDetectionCA in the capability indication 752. The pdcch-BlindDetectionCA has a value of $N_{cells}^{cap}$, which implies the total number of blind detections/CCEs that can be handled by the UE 704 for situations when the total number of configured downlink component carriers is more than 4.

The capability indication 752 may also include a $N_{cells}^{DL,cap,2-DCI}$ indicating the maximum number of component carriers supporting 2-DCI. $N_{cells}^{DL,cap,2-DCI}$ is greater than $N_{cells}^{DL,2-DCI,\mu}$. As described infra, the number of blind detections/CCEs allocated to a component carrier CC with 2-DCI-enabled is increased by a scaling factor, compared with the number of blind detections/CCEs allocated to a component carrier CC with 1-DCI-enabled.

More specifically, the max number of blind detections for a component carrier with m-DCI-enabled is scaled by f(m). The max number of CCEs for a component carrier with m-DCI-enabled is scaled by g(m). The maximum total number of BD and non-overlapped CCE for all configured CCs with m-DCI (m=1 or 2) are given by $$\frac{f(m) \cdot N_{cells}^{cap} \cdot N_{cells}^{DL,m-DCI,\mu} \cdot M_{PDCCH}^{max,slot,\mu}}{\left(f(1)\Sigma_\mu N_{cells}^{DL,1-DCI,\mu} + f(2) \cdot \Sigma_\mu N_{cells}^{DL,2-DCI,\mu}\right)}$$

and $\frac{g(m) \cdot N_{cells}^{cap} \cdot N_{cells}^{DL,m-DCI,\mu} \cdot C_{PDCCH}^{max,slot,\mu}}{\left(g(1)\Sigma_\mu N_{cells}^{DL,1-DCI,\mu} + g(2) \cdot \Sigma_\mu N_{cells}^{DL,2-DCI,\mu}\right)}$.

$m_{PDCCH}^{max,slot,\mu}$ is the maximum number of monitored PDCCH candidates per slot with SCS configuration μ∈ {0, 1, 2, 3} (e.g., $M_{PDCCH}^{max,slot,\mu}$=44 for the case with μ=0, which corresponds to that SCS is 15 KHz); $C_{PDCCH}^{max,slot,\mu}$ is the maximum number of non-overlapped CCEs per slot with SCS configuration μ∈ {0, 1, 2, 3}. μ∈ {0, 1, 2, 3} is defined in 3GPP TS 38.213. As described supra, f(1), f(2), g(1), and g(2) are predefined or configurable scaling factors.

Figure 8:
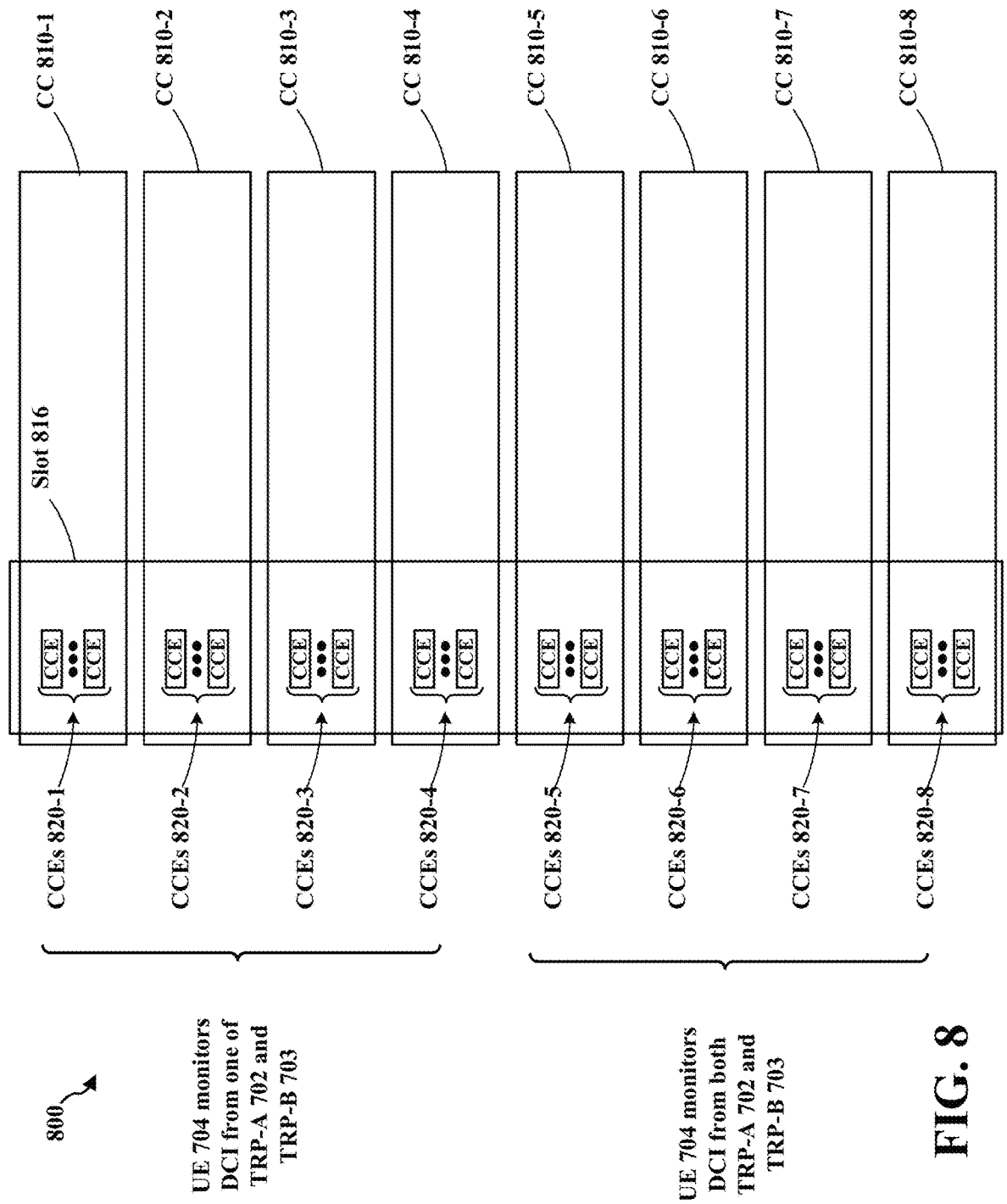
FIG. 8 is a diagram illustrating monitoring PDCCHs by a UE.

FIG. 8 is a diagram 800 illustrating monitoring PDCCHs by a UE 704. In this example, the UE 704 supports carrier aggregation (CA) and is configured to operate on component carriers 810-1 to 810-8. Further, the UE 704 is configured to monitor one PDCCHs from the TRP-A 702 on each of the component carriers 810-1 to 810-4 in a slot 816 and to monitor one PDCCH from the TRP-A 702 and one PDCCH from the TRP-B 703 on each of the component carriers 810-5 to 810-8 in the slot 816. The UE 704 may receive, from the TRP-A 702 and/or the TRP-B 703, one or more non-physical layer configurations that configure the component carriers 810-1 to 810-8. In one configuration, the UE 704 receives a respective signaling including a non-physical layer configuration for configuring each of the component carriers 810-1 to 810-8. The non-physical layer configurations may be transmitted through one or more RRC messages.

In another example, the UE 704 may switch from a first bandwidth part to a second bandwidth part within each of the component carriers 810-1 to 810-8. The UE 704 may receive a non-physical layer configuration associated with the second bandwidth part indicating either single-DCCH or multi-DCCH reception is expected on each of the component carriers 810-1 to 810-8.

Further, in this example. The SCS is 120 kHz. The pdcch-BlindDetectionCA is 4. The UE 704 sends, e.g., through an RRC message, the pdcch-BlindDetectionCA to the TRP-A 702 and/or the TRP-B 703. The UE 704 may report the maximum number of component carriers supporting receiving more than one PDCCHs within a slot. The UE 704 may also report the maximum number of active BWPs across the component carriers 810-1 to 810-8 supporting receiving more than one PDCCH within a slot.

Further, in this example, (1) is 1,1(2) is 2, g(1) is 1, and g(2) is 2. That is, the number of blind detections/CCEs for a component carrier with 2-DCI-enabled is doubled comparing to the number for a component carrier with 1-DCI-enabled.

The UE 704 employs the techniques described supra to determine blind detection allocated on the component carriers 810-1 to 810-8 in a slot 816. More specifically, for m=1 (i.e., 1-DCI-enabled), the total number of blind detections allocated to be performed on the component carriers 810-1 to 810-4 is:

$$\frac{f(m) \cdot N_{cells}^{cap} \cdot N_{cells}^{DL,m-DCI,\mu} \cdot M_{PDCCH}^{max,slot,\mu}}{\left(f(1)\Sigma_\mu N_{cells}^{DL,1-DCI,\mu} + f(2) \cdot \Sigma_\mu N_{cells}^{DL,2-DCI,\mu}\right)} =$$

$$\frac{4 \cdot \left(N_{cells}^{DL,1-DCI,\mu} = 4\right) \cdot M_{PDCCH}^{max,slot,\mu}}{\left(\Sigma_\mu N_{cells}^{DL,1-DCI,\mu} = 4\right) + 2 \cdot \left(\Sigma_\mu N_{cells}^{DL,2-DCI,\mu} = 4\right)} =$$

$$\frac{4 \times 4 \times M_{PDCCH}^{max,slot,\mu}}{12} = \frac{1}{3}\left(4 \times M_{PDCCH}^{max,slot,\mu}\right).$$

The total number of blind detections allocated to be performed on the component carriers 810-5 to 810-8 is:

$$\frac{f(m) \cdot N_{cells}^{cap} \cdot N_{cells}^{DL,m-DCI,\mu} \cdot M_{PDCCH}^{max,slot,\mu}}{\left(f(1)\Sigma_\mu N_{cells}^{DL,1-DCI,\mu} + f(2) \cdot \Sigma_\mu N_{cells}^{DL,2-DCI,\mu}\right)} =$$

$$\frac{2 \times 4 \cdot \left(N_{cells}^{DL,1-DCI,\mu} = 4\right) \cdot M_{PDCCH}^{max,slot,\mu}}{\left(\Sigma_\mu N_{cells}^{DL,1-DCI,\mu} = 4\right) + 2 \cdot \left(\Sigma_\mu N_{cells}^{DL,2-DCI,\mu} = 4\right)} =$$

$$\frac{2 \times 4 \times 4 \times M_{PDCCH}^{max,slot,\mu}}{12} = \frac{2}{3}\left(4 \times M_{PDCCH}^{max,slot,\mu}\right).$$

Further, the UE 704 determines CCEs 820-1 to 820-8 allocated to the component carriers 810-1 to 810-8 in the slot 816. More specifically, for m=1 (i.e., 1-DCI-enabled), the total number of CCEs allocated on the component carriers 810-1 to 810-4 is:

$$\frac{g(m) \cdot N_{cells}^{cap} \cdot N_{cells}^{DL,m-DCI,\mu} \cdot C_{PDCCH}^{max,slot,\mu}}{\left(g(1)\Sigma_\mu N_{cells}^{DL,1-DCI,\mu} + g(2) \cdot \Sigma_\mu N_{cells}^{DL,2-DCI,\mu}\right)} =$$

$$\frac{4 \cdot \left(N_{cells}^{DL,1-DCI,\mu} = 4\right) \cdot C_{PDCCH}^{max,slot,\mu}}{\left(\Sigma_\mu N_{cells}^{DL,1-DCI,\mu} = 4\right) + 2 \cdot \left(\Sigma_\mu N_{cells}^{DL,2-DCI,\mu} = 4\right)} =$$

$$\frac{4 \times 4 \times C_{PDCCH}^{max,slot,\mu}}{12} = \frac{1}{3}\left(4 \times C_{PDCCH}^{max,slot,\mu}\right).$$

The total number of CCEs allocated on the component carriers 810-5 to 810-8 is:

$$\frac{g(m) \cdot N_{cells}^{cap} \cdot N_{cells}^{DL,m-DCI,\mu} \cdot C_{PDCCH}^{max,slot,\mu}}{\left(g(1)\Sigma_\mu N_{cells}^{DL,1-DCI,\mu} + g(2) \cdot \Sigma_\mu N_{cells}^{DL,2-DCI,\mu}\right)} =$$

$$\frac{2 \times 4 \cdot \left(N_{cells}^{DL,1-DCI,\mu} = 4\right) \cdot C_{PDCCH}^{max,slot,\mu}}{\left(\Sigma_\mu N_{cells}^{DL,1-DCI,\mu} = 4\right) + 2 \cdot \left(\Sigma_\mu N_{cells}^{DL,2-DCI,\mu} = 4\right)} =$$

$$\frac{2 \times 4 \times 4 \times C_{PDCCH}^{max,slot,\mu}}{12} = \frac{2}{3}(4 \times C_{PDCCH}^{max,slot,\mu}).$$

In another example, f(1) is 1,1(2)=1, g((1)) is 1, and g((2)) is 1. In other words, the maximum numbers of blind detections/CCEs allocations for each CC are independent of single-DCI or two-DCI based multi-TRP transmission. Further, ceil, floor, or rounding function can be used if the scaled number for max number of blind detections/CCEs is not an integer.

As such, the UE 704 can determine blind detections and CCEs allocated to each of the component carriers 810-1 to 810-8. Accordingly, the UE 704 performs blind detections according to the allocations.

In summary, the total limits for the numbers of blind detections/CCEs across configured component carriers may be calculated as defined in the 3GPP TS 38.213 based on $N_{cells}^{cap}$, which is pdcch-BlindDetectionCA as reported by the UE.

In certain configurations, the maximum numbers of monitored PDCCH candidates and non-overlapped CCEs per slot for total limits, $m_{PDCCH}^{total,slot,\mu}$, $C_{PDCCH}^{total,slot,\mu}$ defined in 3GPP TS 38.213, for a serving cell configured with multi-DCI based multi-TRP transmission are increased as f(2)/f(1) and g(2)/g(1) times the numbers for a serving cell configured with single-DCI based transmission.

In certain configurations, the maximum numbers of blind detections/CCEs, $M_{PDCCH}^{max,slot,\mu}$ and $C_{PDCCH}^{max,slot,\mu}$, are increased as f(2)/f(1) and g(2)/g(1) times the values defined in Table 10.1-2 and Table 10.1-3 in 3GPP TS 38.213 for a serving cell configured with multi-DCI based multi-TRP.

In another technique, indication for the operation of S-DCI or M-DCI is at BWP level. A multi-TRP IE for the indication can be used for 1) enabling single-DCI based multi-TRP transmission; or 2) enabling two-DCI based multi-TRP transmission. In a first configuration, with serving cell based indications, the multi-TRP IE for the indication can be under PDSCH-ServingCellConfig: The IE PDSCH-ServingCellConfig is used to configure UE specific PDSCH parameters that are common across the UE's BWPs of one serving cell.

In a second configuration, with BWP based indications, the multi-TRP IE for the indication can be under BWP-DownlinkDedicated. The IE BWP-DownlinkDedicated is used to configure the dedicated (UE specific) parameters of a downlink BWP. Alternatively, the multi-TRP IE may be introduced under pdsch-Config of BWP-DownlinkDedicated.

Figure 9:
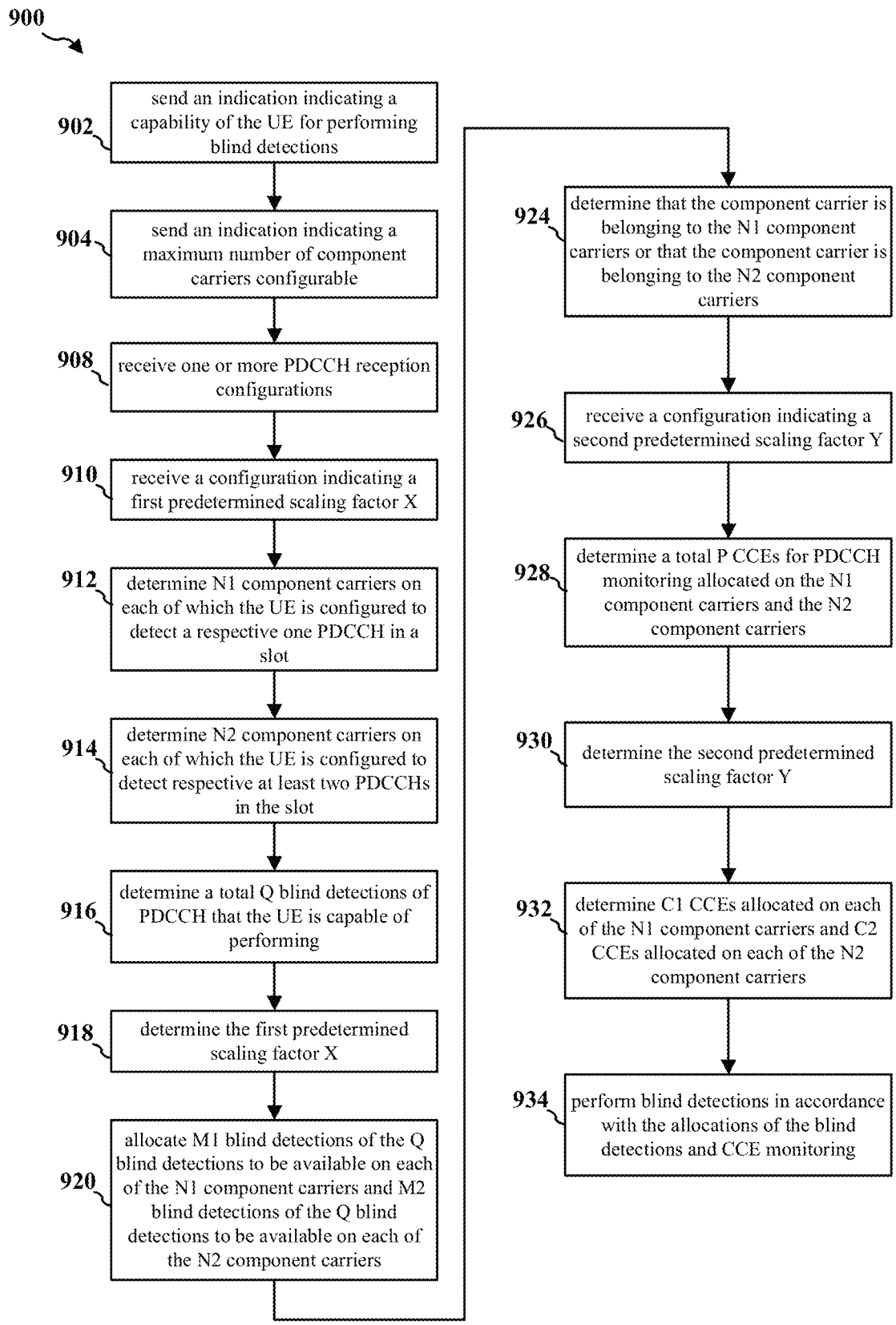
FIG. 9 is a flow chart a method (process) for performing PDCCH monitoring.

FIG. 9 is a flow chart 900 of a method (process) for performing PDCCH monitoring. The method may be performed by a UE (e.g., the UE 704, the apparatus 1002, and the apparatus 1002'). At operation 902, the UE may send an indication indicating a capability of the UE for performing the blind detections. At operation 904, the UE may send an indication indicating a maximum number of component carriers configurable at the UE for supporting reception of at least two PDCCHs in a slot.

At operation 908, the UE receives one or more configurations indicating that the UE is expected to receive one PDCCH on each of the N1 component carriers in a slot and to receive at least two PDCCHs on each of the N2 component carriers in a slot. At operation 910, the UE receives a configuration indicating a first predetermined scaling factor X.

At operation 912, the UE determines the N1 component carriers on each of which the UE is configured to detect a respective one PDCCH in a slot. N1 is a positive integer. At operation 914, the UE determines the N2 component carriers on each of which the UE is configured to detect respective at least two PDCCHs in the slot. N2 is a positive integer. At operation 916, the UE determines a total Q blind detections of PDCCH that the UE is capable of performing. Q is a positive integer. At operation 918, the UE determines the first predetermined scaling factor X. X is a positive number.

At operation 920, the UE allocates M1 blind detections of the Q blind detections to be available on each of the N1 component carriers and M2 blind detections of the Q blind detections to be available on each of the N2 component carriers such that (N1*M1+N2*M2) is a largest integer no greater than Q. M1 is a positive integer. M2 is a positive integer and equal to X*M1.

At operation 924, the UE determines that the component carrier is belonging to the N1 component carriers when the first bandwidth part is activated or that the component carrier is belonging to the N2 component carriers when the second bandwidth part is activated.

At operation 926, the UE receives a configuration indicating the second predetermined scaling factor. At operation 928, the UE determines a total P Control-Channel Elements (CCEs) for PDCCH monitoring allocated on the N1 component carriers and the N2 component carriers. P is a positive integer. At operation 930, the UE determines the second predetermined scaling factor Y. Y is a positive number. At operation 932, the UE determines C1 CCEs allocated on each of the N1 component carriers and C2 CCEs allocated on each of the N2 component carriers such that (N1*C1+N2*M2) is a largest integer no greater than P. C1 is a positive integer. C2 is positive integer and equal to Y*C1. At operation 934, the UE performs blind detections in accordance with the allocations. The PDCCH monitoring is performed on the respective C1 CCEs on each of the N1 component carriers and the respective C2 CCEs on each of the N2 component carriers.

In certain configurations, the respective one PDCCH on each of the N1 component carriers is to be received from a first TRP, wherein the respective at least two PDCCHs are to be received from the first TRP and a second TRP. In certain configurations, the one or more configurations includes a respective non-physical layer configuration for each of the N1 component carriers and the N2 component carriers. In certain configurations, the first predetermined scaling factor is 2. In certain configurations, the second predetermined scaling factor is 2.

Figure 10:
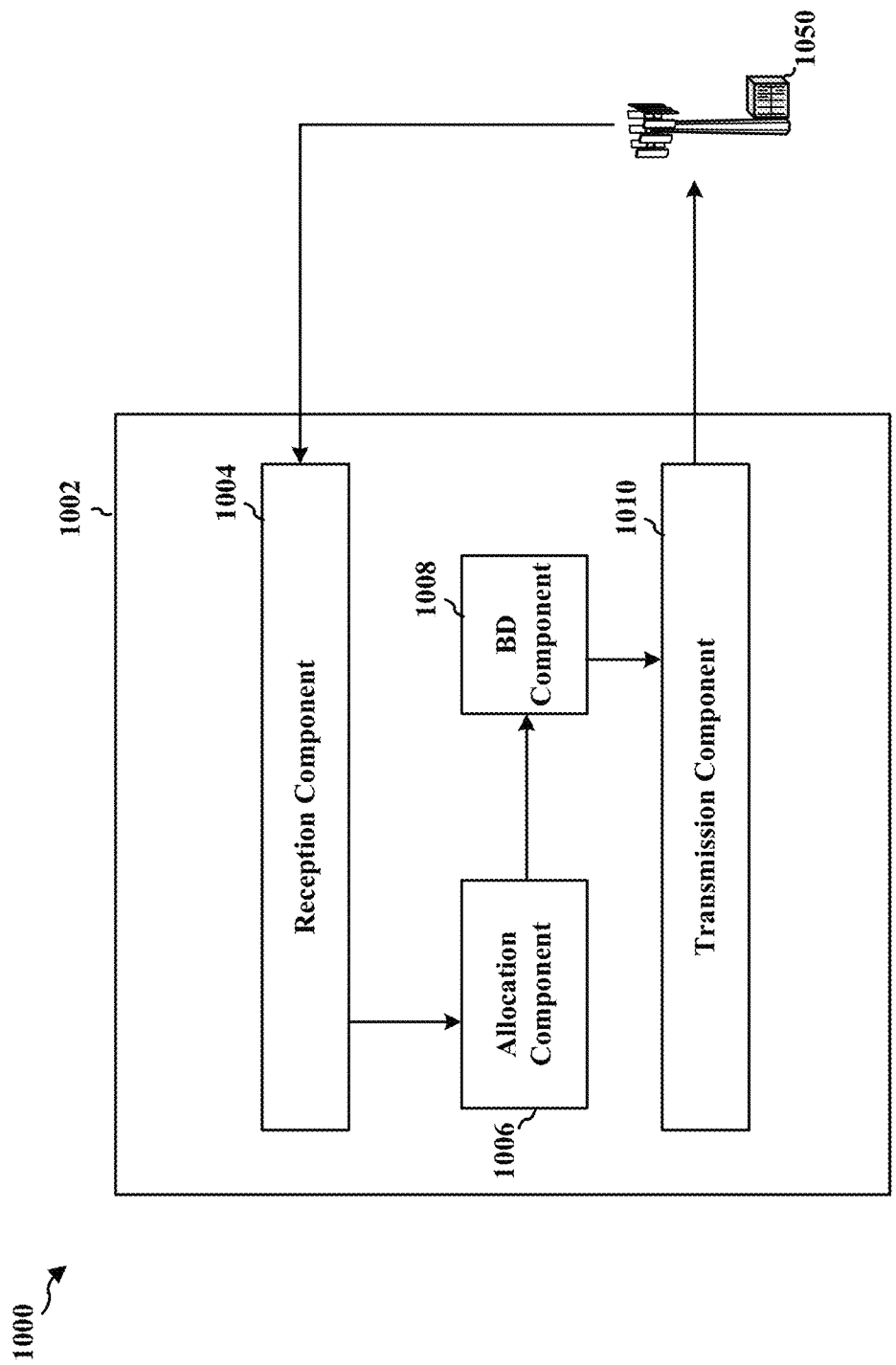
FIG. 10 is a conceptual data flow diagram illustrating the data flow between different components/means in an exemplary apparatus.

FIG. 10 is a conceptual data flow diagram 1000 illustrating the data flow between different components/means in an exemplary apparatus 1002. The apparatus 1002 may be a UE. The apparatus 1002 includes a reception component 1004, an allocation component 1006, a BD component 1008, and a transmission component 1010.

The allocation component 1006 may send an indication indicating a capability of the UE for performing the blind detections. The allocation component 1006 may send an indication indicating a maximum number of component carriers configurable at the UE for supporting reception of at least two PDCCHs in a slot.

The allocation component 1006 receives one or more configurations indicating that the UE is expected to receive one PDCCH on each of the N1 component carriers in a slot and to receive at least two PDCCHs on each of the N2 component carriers in a slot. The allocation component 1006 receives a configuration indicating a first predetermined scaling factor X.

The allocation component 1006 determines the N1 component carriers on each of which the UE is configured to detect a respective one PDCCH in a slot. N1 is a positive integer. The allocation component 1006 determines the N2 component carriers on each of which the UE is configured to detect respective at least two PDCCHs in the slot. N2 is a positive integer. The allocation component 1006 determines a total Q blind detections of PDCCH that the UE is capable of performing. Q is a positive integer. The allocation component 1006 determines the first predetermined scaling factor X. X is a positive number.

The allocation component 1006 allocates M1 blind detections of the Q blind detections to be available on each of the N1 component carriers and M2 blind detections of the Q blind detections to be available on each of the N2 component carriers such that (N1*M1+N2*M2) is a largest integer no greater than Q. M1 is a positive integer. M2 is a positive integer and equal to X*M1.

The allocation component 1006 determines that the component carrier is belonging to the N1 component carriers when the first bandwidth part is activated or that the component carrier is belonging to the N2 component carriers when the second bandwidth part is activated.

The allocation component 1006 receives a configuration indicating the second predetermined scaling factor. The allocation component 1006 determines a total P Control-Channel Elements (CCEs) for PDCCH monitoring allocated on the N1 component carriers and the N2 component carriers. P is a positive integer. The allocation component 1006 determines the second predetermined scaling factor Y. Y is a positive number. The allocation component 1006 determines C1 CCEs allocated on each of the N1 component carriers and C2 CCEs allocated on each of the N2 component carriers such that (N1*C1+N2*C2) is a largest integer no greater than P. C1 is a positive integer. C2 is positive integer and equal to Y*C1.

The BD component 1008 performs blind detections in accordance with the allocations. The PDCCH monitoring is performed on the respective C1 CCEs on each of the N1 component carriers and the respective C2 CCEs on each of the N2 component carriers.

In certain configurations, the respective one PDCCH on each of the N1 component carriers is to be received from a first TRP, wherein the respective at least two PDCCHs are to be received from the first TRP and a second TRP. In certain configurations, the one or more configurations includes a respective non-physical layer configuration for each of the N1 component carriers and the N2 component carriers. In certain configurations, the first predetermined scaling factor is 2. In certain configurations, the second predetermined scaling factor is 2.

Figure 11:
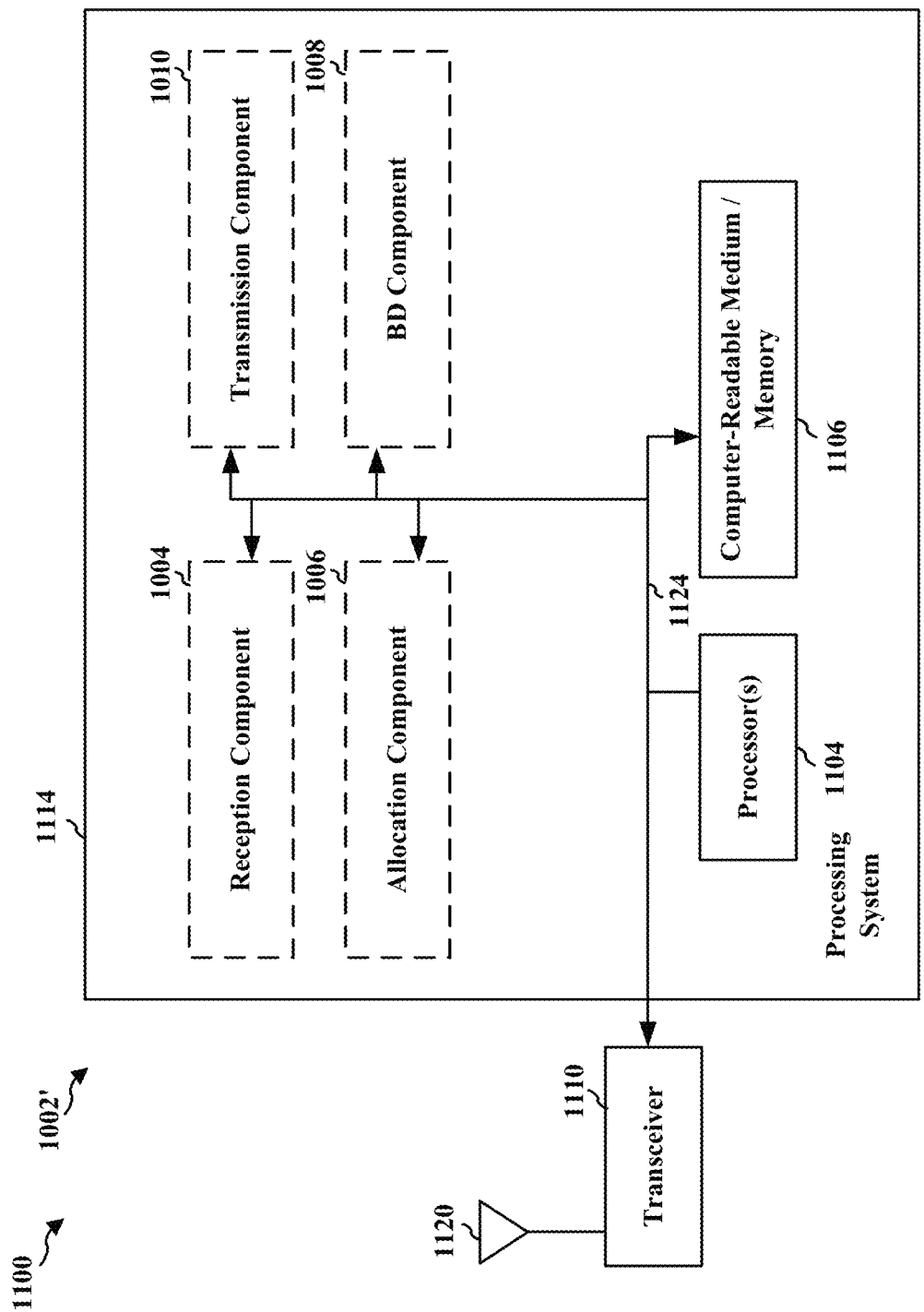
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The apparatus 1002' may be a UE. The processing system 1114 may be implemented with a bus architecture, represented generally by a bus 1124. The bus 1124 may include any number of interconnecting buses and bridges depending on the specific application of the processing system 1114 and the overall design constraints. The bus 1124 links together various circuits including one or more processors and/or hardware components, represented by one or more processors 1104, the reception component 1004, the allocation component 1006, the BD component 1008, the transmission component 1010, and a computer-readable medium/memory 1106. The bus 1124 may also link various other circuits such as timing sources, peripherals, voltage regulators, and power management circuits, etc.

The processing system 1114 may be coupled to a transceiver 1110, which may be one or more of the transceivers 254. The transceiver 1110 is coupled to one or more antennas 1120, which may be the communication antennas 252.

The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120.

The processing system 1114 includes one or more processors 1104 coupled to a computer-readable medium/memory 1106. The one or more processors 1104 are responsible for general processing, including the execution of software stored on the computer-readable medium/memory 1106. The software, when executed by the one or more processors 1104, causes the processing system 1114 to perform the various functions described supra for any particular apparatus. The computer-readable medium/memory 1106 may also be used for storing data that is manipulated by the one or more processors 1104 when executing software. The processing system 1114 further includes at least one of the reception component 1004, the allocation component 1006, the BD component 1008, and the transmission component 1010. The components may be software components running in the one or more processors 1104, resident/stored in the computer readable medium/memory 1106, one or more hardware components coupled to the one or more processors 1104, or some combination thereof. The processing system 1114 may be a component of the UE 250 and may include the memory 260 and/or at least one of the TX processor 268, the RX processor 256, and the communication processor 259.

In one configuration, the apparatus 1002/apparatus 1002' for wireless communication includes means for performing each of the operations of FIG. 9. The aforementioned means may be one or more of the aforementioned components of the apparatus 1002 and/or the processing system 1114 of the apparatus 1002' configured to perform the functions recited by the aforementioned means.

As described supra, the processing system 1114 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining N1 component carriers on each of which the UE is configured to detect a respective one physical down link control channel (PDCCH) in a slot, N1 being a positive integer;
   determining N2 component carriers on each of which the UE is configured to detect respective at least two PDCCHs in the slot, N2 being a positive integer;
   determining a number Q being an upper bound of total blind detections of PDCCH that the UE is capable of performing on the N1 component carriers and the N2 component carriers, Q being a positive integer;
   determining a first predetermined scaling factor X, X being a positive number;
   determining a number M1 being a first upper bound for blind detections on each of the N1 component carriers and a number M2 being a second upper bound for blind detections on each of the N2 component carriers, M1 being a positive integer, M2 being a positive integer and equal to X*M1; and
   performing blind detections on the N1 component carriers and the N2 component carriers based on the upper bound of total blind detections, the first upper bound, and the second upper bound.

2. The method of claim 1, wherein the respective one PDCCH on each of the N1 component carriers is to be received from a first TRP, wherein the respective at least two PDCCHs are to be received from the first TRP and a second TRP.

3. The method of claim 1, further comprising:
   sending an indication indicating a capability of the UE for performing the blind detections.

4. The method of claim 1, further comprising:
   sending an indication indicating a maximum number of component carriers configurable at the UE for supporting reception of at least two PDCCHs in a slot.

5. The method of claim 1, further comprising:
   sending an indication indicating a maximum number of active bandwidth parts across the N1 component carriers and the N2 component carriers and configurable at the UE for supporting reception of multiple PDCCHs in a slot.

6. The method of claim 1, further comprising:
   receiving one or more configurations indicating that the UE is expected to receive one PDCCH on each of the N1 component carriers in a slot and to receive at least two PDCCHs on each of the N2 component carriers in a slot.

7. The method of claim 6, wherein the one or more configurations includes a respective non-physical layer configuration for each of the N1 component carriers and the N2 component carriers.

8. The method of claim 1, further comprising:
   receiving one or more configurations indicating that the UE is expected to receive one PDCCH per slot in a first bandwidth part and is expected to receive at least two PDCCHs per slot in a second bandwidth part, wherein the first bandwidth part and the second bandwidth part are within a component carrier, and
   determining that the component carrier is belonging to the N1 component carriers when the first bandwidth part is activated or that the component carrier is belonging to the N2 component carriers when the second bandwidth part is activated.

9. The method of claim 1, wherein the first predetermined scaling factor is 2.

10. The method of claim 1, further comprising:
    receiving a configuration indicating the first predetermined scaling factor.

11. The method of claim 1, further comprising:
    determining a number P being an upper bound of total Control-Channel Elements (CCEs) for PDCCH monitoring on the N1 component carriers and the N2 component carriers, P being a positive integer;
    determining a second predetermined scaling factor Y, Y being a positive number;
    determining C1 being an upper bound of CCEs for PDCCH monitoring on each of the N1 component carriers and C2 being an upper bound of CCEs for PDCCH monitoring on each of the N2 component carriers, C1 being a positive integer, C2 being a positive integer and equal to Y*C1.

12. The method of claim 11, wherein the second predetermined scaling factor is 2.

13. The method of claim 11, further comprising:
    receiving a configuration indicating the second predetermined scaling factor.

14. An apparatus for wireless communication, the apparatus being a user equipment (UE), comprising:

a memory; and at least one processor coupled to the memory and configured to:

determine N1 component carriers on each of which the UE is configured to detect a respective one physical down link control channel (PDCCH) in a slot, N1 being a positive integer;

determine N2 component carriers on each of which the UE is configured to detect respective at least two PDCCHs in the slot, N2 being a positive integer;

determine a number Q being an upper bound of total blind detections of PDCCH that the UE is capable of performing on the N1 component carriers and the N2 component carriers, Q being a positive integer;

determine a first predetermined scaling factor X, X being a positive number;

determine a number M1 being a first upper bound for blind detections on each of the N1 component carriers and a number M2 being a second upper bound for blind detections on each of the N2 component carriers, M1 being a positive integer, M2 being a positive integer and equal to X*M1; and perform blind detections on the N1 component carriers and the N2 component carriers based on the upper bound of total blind detections, the first upper bound, and the second upper bound.

15. The apparatus of claim 14, wherein the respective one PDCCH on each of the N1 component carriers is to be received from a first TRP, wherein the respective at least two PDCCHs are to be received from the first TRP and a second TRP.

16. The apparatus of claim 14, wherein the at least one processor is further configured to:

send an indication indicating a capability of the UE for performing the blind detections.

17. The apparatus of claim 14, wherein the at least one processor is further configured to:

send an indication indicating a maximum number of component carriers configurable at the UE for supporting reception of at least two PDCCHs in a slot.

18. The apparatus of claim 14, wherein the at least one processor is further configured to:

send an indication indicating a maximum number of active bandwidth parts across the N1 component carriers and the N2 component carriers and configurable at the UE for supporting reception of multiple PDCCHs in a slot.

19. The apparatus of claim 14, wherein the at least one processor is further configured to:

receive one or more configurations indicating that the UE is expected to receive one PDCCH on each of the N1 component carriers in a slot and to receive at least two PDCCHs on each of the N2 component carriers in a slot.

20. A non-transitory computer-readable medium storing computer executable code for wireless communication of a user equipment (UE), comprising code to:

determine N1 component carriers on each of which the UE is configured to detect a respective one physical down link control channel (PDCCH) in a slot, N1 being a positive integer;

determine N2 component carriers on each of which the UE is configured to detect respective at least two PDCCHs in the slot, N2 being a positive integer;

determine a number Q being an upper bound of total blind detections of PDCCH that the UE is capable of performing on the N1 component carriers and the N2 component carriers, Q being a positive integer;

determine a first predetermined scaling factor X, X being a positive number;

determine a number M1 being a first upper bound for blind detections on each of the N1 component carriers and a number M2 being a second upper bound for blind detections on each of the N2 component carriers, M1 being a positive integer, M2 being a positive integer and equal to X*M1; and perform blind detections on the N1 component carriers and the N2 component carriers based on the upper bound of total blind detections, the first upper bound, and the second upper bound.

* * * * *